(12) United States Patent
Cho

(10) Patent No.: US 10,982,547 B2
(45) Date of Patent: Apr. 20, 2021

(54) COMPRESSOR HAVING REINFORCING DISK, AND GAS TURBINE HAVING SAME

(71) Applicant: DOOSAN HEAVY INDUSTRIES & CONSTRUCTION CO., LTD., Changwon-si (KR)

(72) Inventor: Geon Hwan Cho, Gimhae-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 263 days.

(21) Appl. No.: 15/712,753

(22) Filed: Sep. 22, 2017

(65) Prior Publication Data
US 2018/0298759 A1    Oct. 18, 2018

(30) Foreign Application Priority Data
Apr. 12, 2017   (KR) .................... 10-2017-0047338

(51) Int. Cl.
   *F01D 5/08*    (2006.01)
   *F04D 29/32*   (2006.01)
   (Continued)

(52) U.S. Cl.
   CPC ............ *F01D 5/087* (2013.01); *F01D 5/082* (2013.01); *F02C 3/04* (2013.01); *F04D 29/321* (2013.01);
   (Continued)

(58) Field of Classification Search
   CPC . F01D 5/08; F01D 5/087; F01D 5/088; F01D 5/082; F01D 5/06; F01D 5/066;
   (Continued)

(56) References Cited

U.S. PATENT DOCUMENTS 2,908,518 A * 10/1959 Gregory .................... F16D 1/06
                                                       403/245
2,925,216 A *  2/1960 Stalker ...................... F01D 5/06
                                                       415/220
(Continued)

FOREIGN PATENT DOCUMENTS

EP    2412924 A2    2/2012
EP    2840230 A1    2/2015
(Continued)

OTHER PUBLICATIONS

English machine translation of EP 2 840 230 A1, Oct. 12, 2019.*
(Continued)

*Primary Examiner* — Christopher Verdier
(74) *Attorney, Agent, or Firm* — INVENSTONE Patent, LLC

(57) ABSTRACT

A compressor, which is mounted to a gas turbine and generates high temperature and high pressure compressed air and supplies the compressed air to a combustor, the compressor including: a plurality of main disks provided on an outer circumferential surface of a rotation shaft along a circumferential direction, and spaced apart from each other at predetermined intervals such that a portion of the compressed air flows toward the rotation shaft; and a reinforcing disk mounted to each space defined by the plurality of main disks spaced apart from each other, the reinforcing disk having the rotation shaft in common with the main disks, and being provided with a passage formed in a direction from an outer circumferential surface thereof toward the rotation shaft.

14 Claims, 12 Drawing Sheets

(51) Int. Cl.
*F04D 29/58* (2006.01)
*F02C 3/04* (2006.01)
*F01D 5/06* (2006.01)

(52) U.S. Cl.
CPC .............. *F04D 29/584* (2013.01); *F01D 5/06* (2013.01); *F05D 2240/81* (2013.01); *F05D 2260/20* (2013.01); *Y02T 50/60* (2013.01)

(58) Field of Classification Search
CPC .... F04D 29/321; F04D 29/322; F04D 29/584; F05B 2260/20; F05D 2260/20
USPC .............................. 416/198 A, 200 A, 201 R
See application file for complete search history.

(56) References Cited

U.S. PATENT DOCUMENTS

| | | | | |
|---|---|---|---|---|
| 2,928,649 | A * | 3/1960 | Lombard | F01D 5/06 416/198 R |
| 2,996,280 | A * | 8/1961 | Wilson, III | F01D 25/08 416/97 R |
| 4,127,988 | A | 12/1978 | Becker | |
| 4,231,704 | A | 11/1980 | Ayache | |
| 4,415,310 | A * | 11/1983 | Bouiller | F01D 5/3069 416/95 |
| 8,459,951 | B2 * | 6/2013 | Arrell | F04D 29/321 416/201 R |
| 2007/0258813 | A1 * | 11/2007 | Klutz | F01D 5/087 416/90 R |
| 2013/0283813 | A1 * | 10/2013 | Laurello | F02C 6/08 60/782 |
| 2015/0354389 | A1 | 12/2015 | Pack et al. | |
| 2016/0146010 | A1 * | 5/2016 | Costamagna | F01D 5/06 416/183 |
| 2016/0195110 | A1 * | 7/2016 | Kolk | F04D 29/266 416/95 |
| 2018/0223669 | A1 * | 8/2018 | Hwang | F01D 5/082 |

FOREIGN PATENT DOCUMENTS

| | | |
|---|---|---|
| JP | 199713902 A | 1/1997 |
| JP | 1999153001 A | 6/1999 |
| JP | 2000179355 A | 6/2000 |
| JP | 2004-027927 A | 1/2004 |
| JP | 2013139789 A | 7/2013 |
| JP | 2016-524095 A | 8/2016 |
| JP | 6043370 B2 | 12/2016 |

OTHER PUBLICATIONS

English machine translation of JP 2004-27927, Oct. 12, 2019.*
A Japanese Office Action dated Jul. 10, 2018 in connection with Japanese Patent Application No. 2017-183061 which corresponds to the above-referenced U.S. application.

* cited by examiner

COMPRESSOR HAVING REINFORCING DISK, AND GAS TURBINE HAVING SAME

CROSS REFERENCE TO RELATED APPLICATION

The present application claims priority to Korean Patent Application No. 10-2017-0047338, filed Apr. 12, 2017, the entire contents of which is incorporated herein for all purposes by this reference.

BACKGROUND

The present disclosure relates generally to a compressor being mounted to a gas turbine and generating high temperature and high pressure compressed air to supply the compressed air to a combustor, and a gas turbine having the same. More particularly, the present disclosure relates to a compressor that is structurally reinforced and is configured to improve internal extraction pressure drop reduction performance, and a gas turbine having the same.

Generally, a gas turbine engine is a kind of rotary internal combustion engine that rotates the turbine to obtain torque by the expansion of high temperature and high pressure combustion gas.

In other words, the air with increased pressure by dynamic pressure is pressurized again with a compressor and made into high temperature gas at 800 to 1200° C. in the combustion chamber, then the gas expands in the turbine up to a pressure ratio at which the required output of the compressor can be obtained, and it is ejected at a high speed through the jet nozzle at the remaining pressure to obtain the propulsion.

The gas turbine includes a compressor, a combustor, and a turbine.

The air flowing in from an air inlet is compressed by the compressor into high temperature and high pressure compressed air. The fuel is supplied to the compressed air by the combustor and the mixture is combusted.

The high temperature and high pressure combustion gas drives the turbine, and drives a generator connected to the turbine.

In the turbine, a plurality of stator blades and rotor blades are alternately arranged and formed in the compartment, and the output shaft to which the generator is connected is rotationally driven by driving the rotor blades by the combustion gas. Further, the combustion gas having driven the turbine is converted to a static pressure by the diffuser of the exhaust compartment and then released to the atmosphere.

A gas turbine has recently been required to have higher output and higher efficiency, and the temperature of combustion gas induced by stator and rotor blades tends to increase gradually. Therefore, in general, a cooling passage is formed inside the stator and the rotor blades, and a cooling medium such as air or steam flows in the cooling passage to cool these stator and rotor blades so as to secure heat resistance, and at the same time, the combustion gas temperature is increased and the output and efficiency of the gas turbine are increased by achieving high temperature of the combustion gas.

Thereby, the compressor disk of a gas turbine limits the surface roughness of the contact surface to a predetermined range, and the shaking tolerance of the contact surface is also limited to a predetermined range. In addition, the tolerance of the interference fit when assembling each disk is limited to a predetermined range.

Further, the compressor disk of gas turbine with a predetermined structure is manufactured to achieve various purposes mentioned above.

For example, as shown in FIGS. 1a and 1b, a de-swirler type vortex reducer structure using a vane may be applied to the compressor disk of a gas turbine.

In this case, only the circumferential velocity component of the cooling air is reduced, and there is a limit to the reduction of the pressure drop.

Further, as shown in FIG. 2, a tube type vortex reducer structure may be applied to the compressor disk of a gas turbine. In this case, it is structurally vulnerable.

BRIEF SUMMARY

In an example, there is provided a compressor which is mounted to a gas turbine and which is provided with a plurality of rotating members on an outer circumferential surface of a rotation shaft along a circumferential direction so as to generate high temperature and high pressure compressed air and supply the compressed air to a combustor, the compressor including: a plurality of main disks provided on an outer circumferential surface of a rotation shaft along the circumferential direction, and spaced apart from each other at predetermined intervals such that a portion of compressed air flows toward the rotation shaft; and a reinforcing disk mounted to each space defined by the plurality of main disks spaced apart from each other, the reinforcing disk having a rotation shaft in common with the main disks, and being provided with a passage formed in a direction from an outer circumferential surface of the reinforcing disk toward the rotation shaft.

In an embodiment of the present disclosure, each of the main disks may include: a support being engaged with a dovetail coupling protrusion for mounting a compressor blade and extending radially inward; a side support being integrally provided on the support, and laterally extending to protrude to be in surface contact with a neighboring main disk; and a blade being integrally provided in the support, and extending from the outer circumferential surface of the rotation shaft by a predetermined height.

In an embodiment of the present disclosure, the support may be provided with a curved surface at a first end thereof to correspond to the outer circumferential surface of the rotation shaft, and has a polygonal cross section with a width thereof being gradually increased in a direction toward the outer circumferential surface of the rotation shaft.

In an embodiment of the present disclosure, the reinforcing disk may be mounted between the side support and a neighboring side support.

In the above case, the reinforcing disk may include: a mount part being coupled with a first end of the side support, and having a structure corresponding to the first end of the side support; and a swelling part being integrally provided in the mount part by extending from the mount part by a predetermined length, and having a structure corresponding to the space defined by the main disks.

Further, the swelling part may have a cross section with a width thereof being gradually increased in one direction.

In an embodiment of the present disclosure, the swelling part may be provided with an inclined surface at a first side thereof to be inclined at a predetermined angle, and the inclined surface may be provided at a location facing a rotation direction of the reinforcing disk to reduce a circumferential velocity component of the compressed air flowing toward the rotation shaft.

In an embodiment of the present disclosure, the reinforcing disk may be provided with a mount part mounted between a main disk and a neighboring main disk to connect the main disks.

In an embodiment of the present disclosure, the passage provided in the reinforcing disk may be provided in the reinforcing disk.

In an embodiment of the present disclosure, the passage provided in the reinforcing disk may be inclined in a direction opposite to a rotation direction of the reinforcing disk.

In the above case, an inclination angle of the passage may range from 30 degrees to 60 degrees based on an imaginary diameter D passing through the rotation shaft of the reinforcing disk.

In an embodiment of the present disclosure, the reinforcing disk may be provided with at least two passages.

In an embodiment of the present disclosure, the reinforcing disk may include: at least two inflow passages provided in the reinforcing disk in a direction from the outer circumferential surface thereof toward the rotation shaft, and spaced apart from each other at a predetermined interval; and a discharge passage provided in the reinforcing disk to communicate with the inflow passages and with an end of the reinforcing disk, so as to allow the compressed air flowing from the inflow passages to flow toward the rotation shaft.

In an embodiment of the present disclosure, the passage provided in the reinforcing disk may include: an inflow passage being provided in the reinforcing disk in a direction from the outer circumferential surface thereof toward the rotation shaft, and having an inner diameter d1 of a predetermined size; and a discharge passage being provided in the reinforcing disk to communicate with the inflow passage and with an end of the reinforcing disk so as to allow the compressed air flowing from the inflow passage to flow toward the rotation shaft, and having an inner diameter d2 smaller than the inner diameter d1 of the inflow passage.

In an embodiment of the present disclosure, the passage provided in the reinforcing disk may be inclined in a direction facing a rotation direction of the reinforcing disk, and the outer circumferential surface of the reinforcing disk may be provided with an inclined surface inclined toward an inlet of the passage.

In another example, there is provided a gas turbine including a compressor provided with a plurality of rotating members on an outer circumferential surface of a rotation shaft along a circumferential direction, so as to generate high temperature and high pressure compressed air and supply the compressed air to a combustor, wherein the compressor includes: a plurality of main disks provided on the outer circumferential surface of the rotation shaft along the circumferential direction, and spaced apart from each other at predetermined intervals such that a portion of the compressed air flows toward the rotation shaft; and a reinforcing disk mounted to each space defined by the plurality of main disks spaced apart from each other, the reinforcing disk having a rotation shaft in common with the main disks, and being provided with a passage formed in a direction from an outer circumferential surface thereof toward the rotation shaft.

In an embodiment of the present disclosure, the reinforcing disk may include: a mount part protruding to be in surface contact with a portion of a neighboring main disk; and a swelling part being integrally provided in the mount part by extending from the mount part by a predetermined length, and having a structure corresponding to the space defined by the main disks.

In an embodiment of the present disclosure, the passage provided in the reinforcing disk may be inclined in a direction opposite to a rotation direction of the reinforcing disk.

In an embodiment of the present disclosure, the reinforcing disk may include: at least two inflow passages provided in the reinforcing disk in a direction from the outer circumferential surface thereof toward the rotation shaft, and spaced apart from each other at a predetermined interval; and a discharge passage provided in the reinforcing disk to communicate with the inflow passages and with an end of the reinforcing disk, so as to allow the compressed air flowing from the inflow passages to flow toward the rotation shaft.

In an embodiment of the present disclosure, the passage provided in the reinforcing disk may include: an inflow passage being provided in the reinforcing disk in a direction from the outer circumferential surface thereof toward the rotation shaft, and having an inner diameter d1 of a predetermined size; and a discharge passage being provided in the reinforcing disk to communicate with the inflow passage and with an end of the reinforcing disk so as to allow the compressed air flowing from the inflow passage to flow toward the rotation shaft, and having an inner diameter d2 smaller than the inner diameter d1 of the inflow passage.

In an embodiment of the present disclosure, the passage provided in the reinforcing disk may be inclined in a direction facing a rotation direction of the reinforcing disk, and the outer circumferential surface of the reinforcing disk may be provided with an inclined surface inclined toward an inlet of the passage.

In an example, a compressor may be provided with main disks and a reinforcing disk having predetermined structures, which may be structurally reinforced and improve internal extraction pressure drop reduction performance.

In an example, the compressor includes: a plurality of main disks provided on the outer circumferential surface of the rotation shaft along the circumferential direction, and spaced apart from each other at predetermined intervals such that a portion of the compressed air flows toward the rotation shaft; and a reinforcing disk mounted to each space defined by the plurality of main disks spaced apart from each other, the reinforcing disk having a rotation shaft in common with the main disks, and being provided with a passage formed in a direction from an outer circumferential surface thereof toward the rotation shaft, the passage being radially formed through a circumferential center of the reinforcing disk. It is possible to achieve improved structural stability of a compressor disk in comparison with the related art, and it is possible to considerably improve internal extraction pressure drop reduction performance.

Further, since the compressor may be provided with main disks each including a support, a side support, and a blade with predetermined structures, it is possible to provide a compressor that is structurally reinforced.

Further, since the compressor may be configured such that the support is provided with a curved surface having a predetermined structure at a first end thereof and has a polygonal cross section with a width thereof being gradually increased in a direction toward the outer circumferential surface of the rotation shaft, it is possible to provide a compressor that is structurally reinforced.

Further, since the compressor may be provided with a reinforcing disk including a mount part and a swelling part with predetermined structures, it is possible to provide a compressor that is structurally reinforced.

Further, since the compressor may be configured such that the swelling part is provided with an inclined surface having a predetermined structure at a predetermined location thereof to reduce a circumferential velocity component of the compressed air flowing toward the rotation shaft, it is possible to lead to smooth flow of the compressed air flowing toward the rotation shaft, and as a result, it is possible to significantly improve cooling effect on the main disks and the rotation shaft.

Further, since the compressor may be configured such that the reinforcing disk is provided with a passage having a predetermined structure, it is possible to lead to smooth flow of the compressed air flowing toward the rotation shaft, and as a result, it is possible to significantly improve cooling effect on the main disks and the rotation shaft.

Further, since the gas turbine may be provided with a compressor having a predetermined structure, it is possible to provide a gas turbine that is structurally reinforced and is capable of significantly improving cooling effect on the main disks and the rotation shaft, and improving internal extraction pressure drop reduction performance of a vortex reducer.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Reference will now be made in detail to preferred embodiments of the present disclosure with reference to the accompanying drawings. Before describing, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Throughout the specification, when a member is "on" another member, it includes not only when a member is in contact with another member, but also when there is another member between the two members. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 1A:
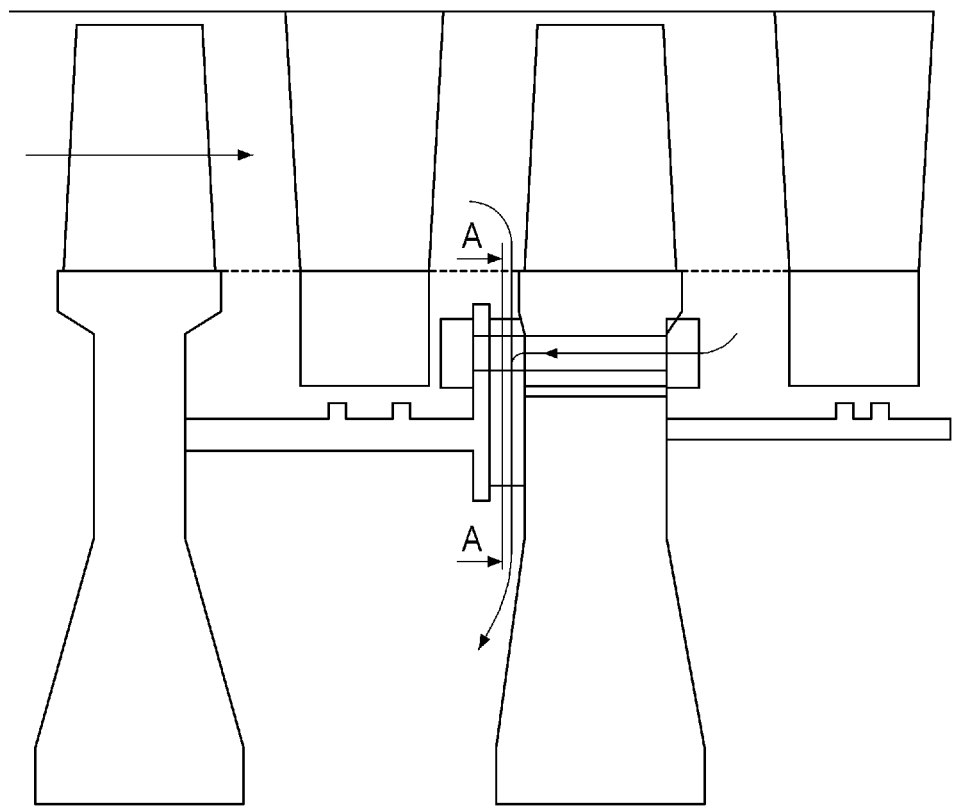
FIG. 1A is a schematic view showing a de-swirler type vortex reducer using a vane according to the related art.
Figure 1B:
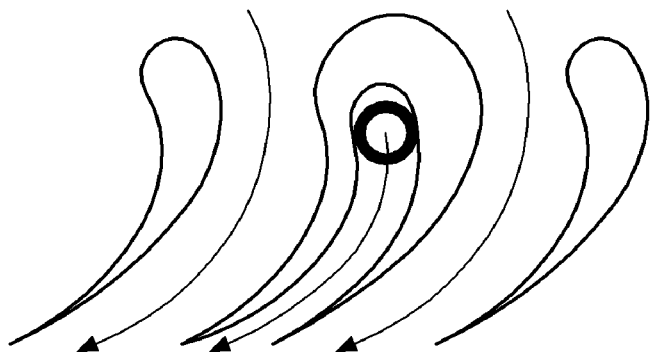
FIG. 1B is a view along line A-A of FIG. 1A.
Figure 2:
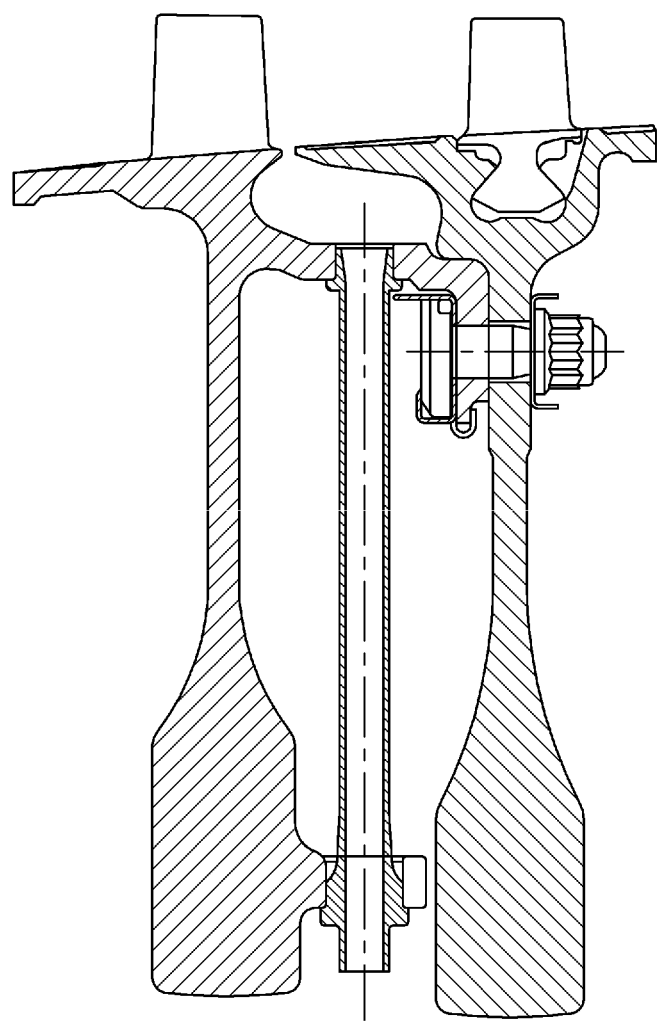
FIG. 2 is a schematic view showing a vortex reducer using a tube according to the related art.
Figure 3:
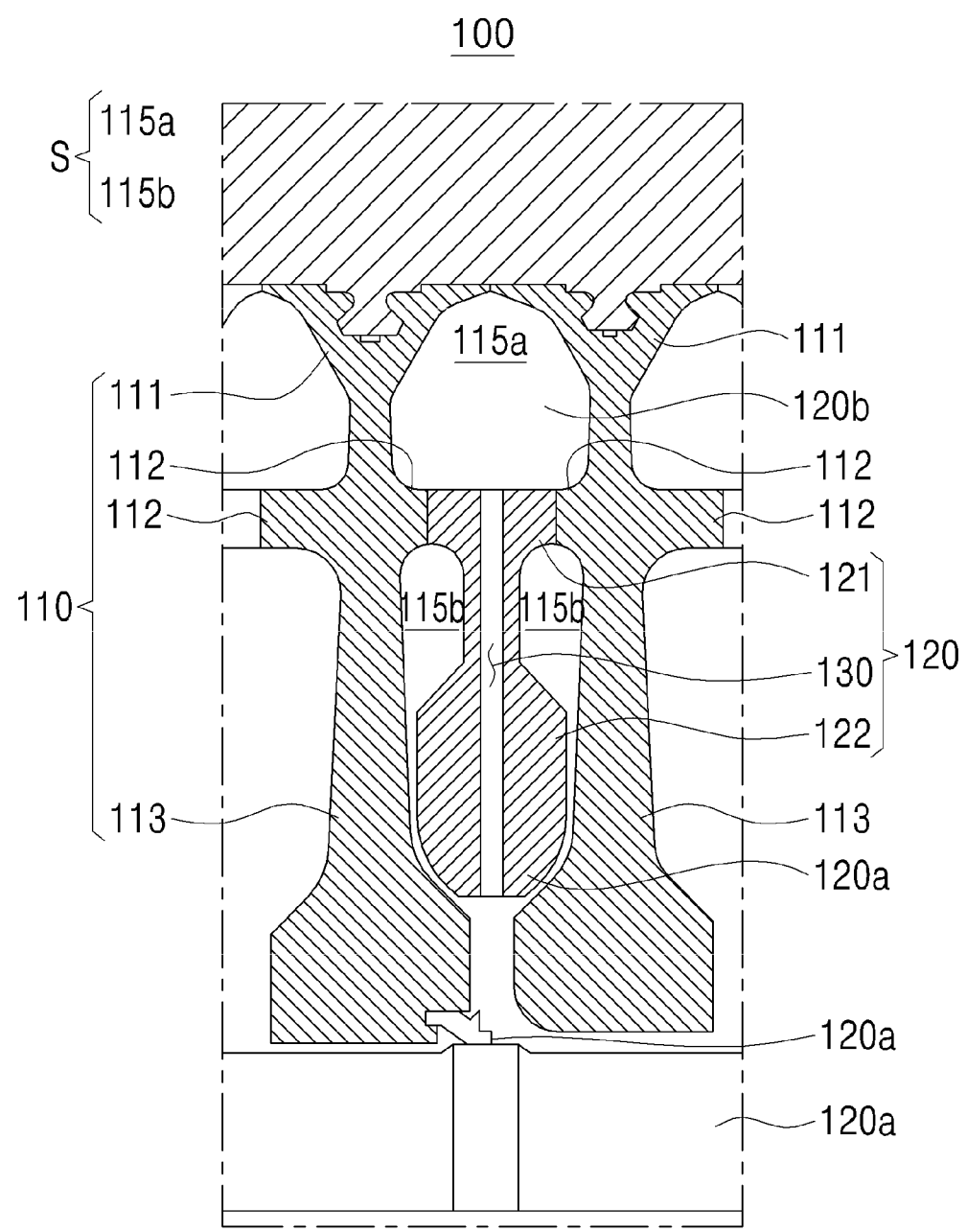
FIG. 3 is a sectional view showing main disks and a reinforcing disk of a compressor according to an embodiment of the present disclosure.

FIG. 3 is a sectional view showing main disks and a reinforcing disk of a compressor according to an embodiment of the present disclosure.

Referring to FIG. 3, a compressor 100 according to the embodiment is an apparatus, which is mounted to a gas turbine and generates high temperature and high pressure compressed air to supply the compressed air to a combustor. The gas turbine may include a plurality of rotating members provided on an outer circumferential surface of a rotation shaft 101 along a circumferential direction.

The compressor 100 according to the embodiment includes main disks 110 having a predetermined structure, and a reinforcing disk 120 formed with a passage 130, whereby it is possible to achieve improved structural stability of a compressor disk in comparison with the related art, and whereby it is possible to considerably improve internal extraction pressure drop reduction performance.

Main Disks 110

Figure 4:
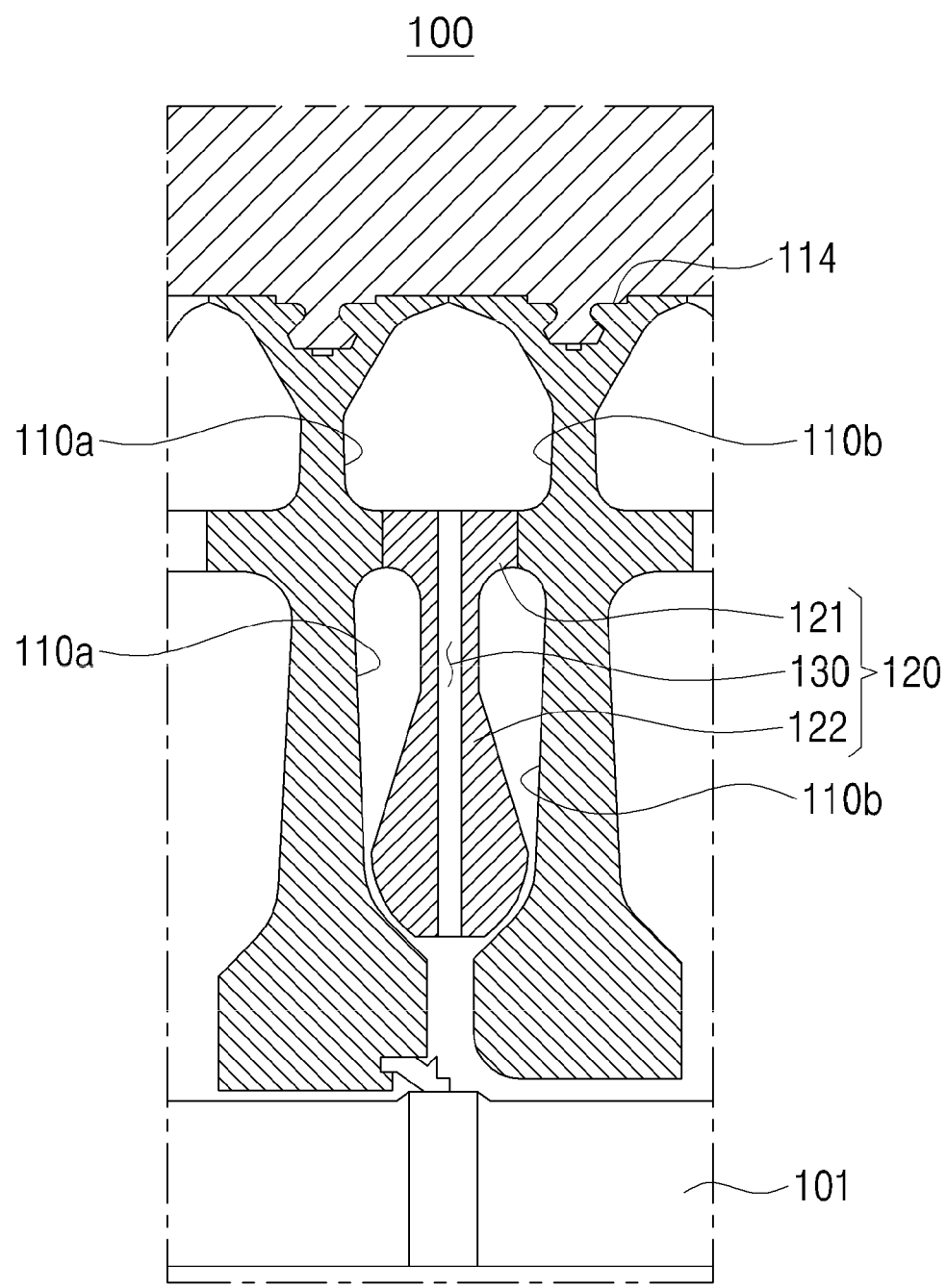
FIG. 4 is a sectional view showing main disks and a reinforcing disk of a compressor according to another embodiment of the present disclosure.

To be more specific, as shown in FIGS. 3 and 4, a plurality of main disks 110 may be provided on the outer circumferential surface of the rotation shaft 101 along the circumferential direction, and may be spaced apart from each other at predetermined intervals such that a portion of the compressed air flows toward the rotation shaft.

Each of the main disks 110 according to the embodiment may include: a support 111; a side support 112; and an inner portion 113.

Accordingly, the compressor 100 according to the embodiment configured as described above may be structurally reinforced.

To be more specific, the support 111 may form an outer periphery of the main disks 110 and be engaged with a dovetail coupling protrusion for mounting a compressor blade (not shown). The support 111 may extend radially inward to the side support 112.

Preferably, as shown in FIG. 4, the support 111 is provided with a curved surface 114 to correspond to an inner circumferential surface of the compressor blade. In this case, the support 111 and the outer circumferential surface of the rotation shaft 101 are brought into contact with each other, whereby it is possible to achieve structural stability.

Further, the support 111 may have a polygonal cross section with a width thereof being gradually increased in a direction toward its outer circumferential surface. Also in this case, the support 111 and the inner circumferential surface of the compressor blade are brought into contact with each other, whereby it is possible to achieve structural stability.

The side support 112 may be integrally provided on the support 111, and may be laterally extend to protrude to be in surface contact with a neighboring main disk 110. Here, as shown in FIGS. 3 and 4, the reinforcing disk 120 may be mounted between the side support 112 and a neighboring side support 112. The mounting method is not particularly limited, and may be, for example, a coupling structure or a force fitting structure.

Further, the blade 113 may be integrally provided in the support 111, and may extend from the outer circumferential surface of the rotation shaft 101 by a predetermined height. The main disks 110 are assembled to the rotation shaft 101 by a fastener 102, and a cooling passage is formed between the rotation shaft and the inner portion 113 of each main disk.

Reinforcing Disk 120

To be more specific, as shown in FIGS. 3 and 4, the reinforcing disk 120 may be mounted to each space defined by the plurality of main disks 110 spaced apart from each other, may have a rotation shaft 101 in common with the main disks 110, and may be provided with a passage 130 formed in a direction from an outer circumferential surface thereof toward the rotation shaft, the passage being radially formed through a circumferential center of the reinforcing disk. The reinforcing disk 120 has a first radial end 120a disposed toward the rotation shaft 101 and a second radial end 120b facing in a direction opposite to the first radial end.

Here, it is preferred that the passage 130 be provided in the reinforcing disk 120. Further, the reinforcing disk 120 may be provided with at least two passages 130.

The reinforcing disk 120 according to the embodiment may include a mount part 121 and a swelling part 122 having predetermined structures.

Accordingly, the compressor 100 according to the embodiment configured as described above may be structurally reinforced.

To be more specific, as shown in FIGS. 3 and 4, it is preferred that the mount part 121 be coupled with a first end of the side support 112, and have a structure corresponding to the first end of the side support 112. Here, the mount part 121 may be mounted between a main (first) disk 110 and a neighboring main (second) disk 110 to connect the main disks. The main disk 110 includes a first circumferential side surface 110a that faces toward the neighboring main disk 110, and the neighboring main disk 110 includes a second circumferential side surface 110b that faces toward the main disk 110.

Further, as shown in FIGS. 3 and 4, the swelling part 122 may be integrally provided in the mount part 121 by extending from the mount part by a predetermined length, and may have a structure corresponding to the space S defined by the main disks 110 between the first and second circumferential side surfaces 110a and 110b. The space S includes an outer plenum 115a on a radially outer side of the mount portion 112 and an inner plenum 115b on a radially inner side of the mount portion 112.

In some cases, as shown in FIG. 4, the swelling part 122 may have a cross section with a width thereof being gradually increased in a radially inward direction. Other than the cross section of the swelling part 122, features of the main disks 110 and the reinforcing disk 120 of a compressor according to the present disclosure are common to both FIGS. 3 and 4.

Embodiment of Reinforcing Disk 120

Figure 5:
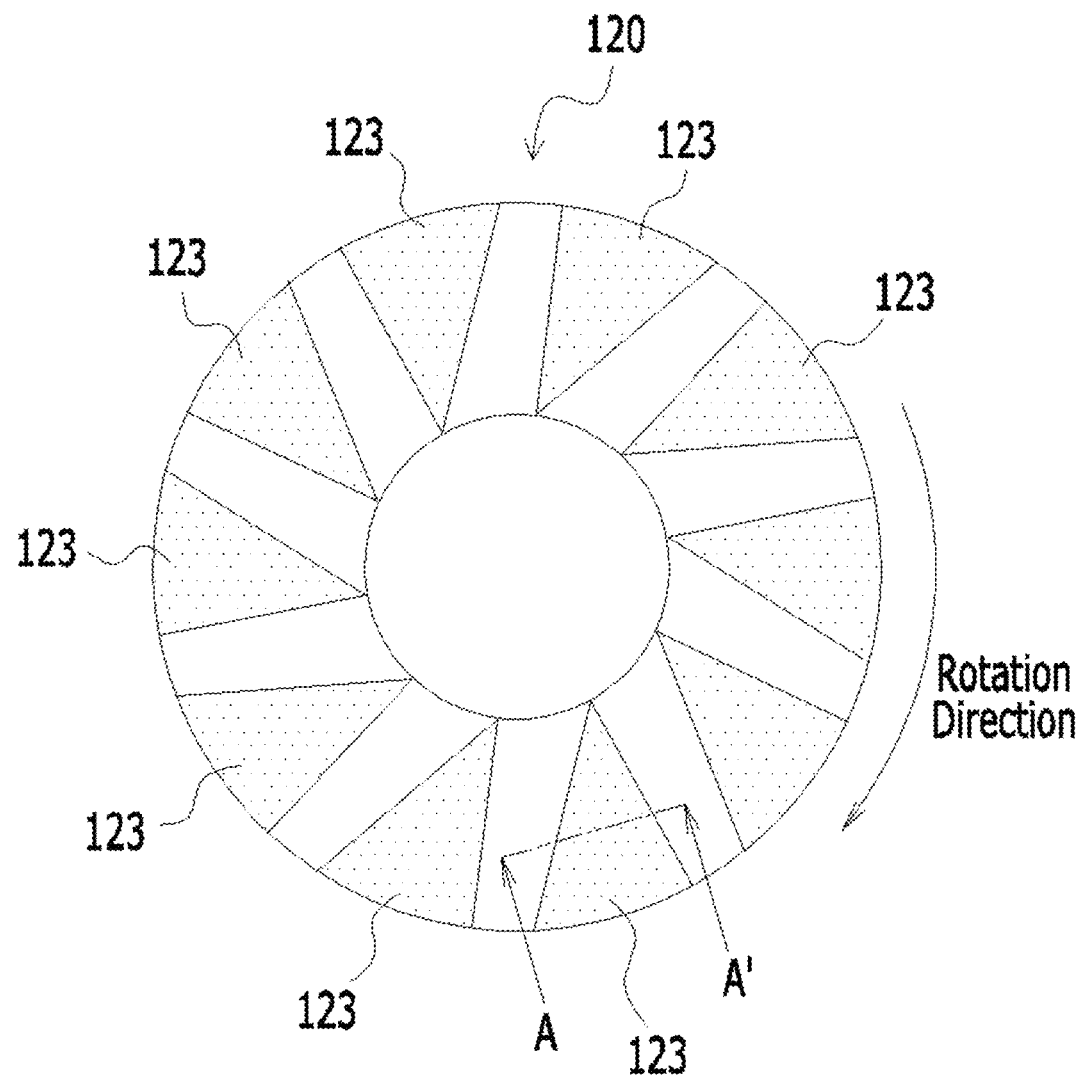
FIG. 5 is a plan view showing a reinforcing disk of a compressor according to a further embodiment of the present disclosure.
Figure 6:
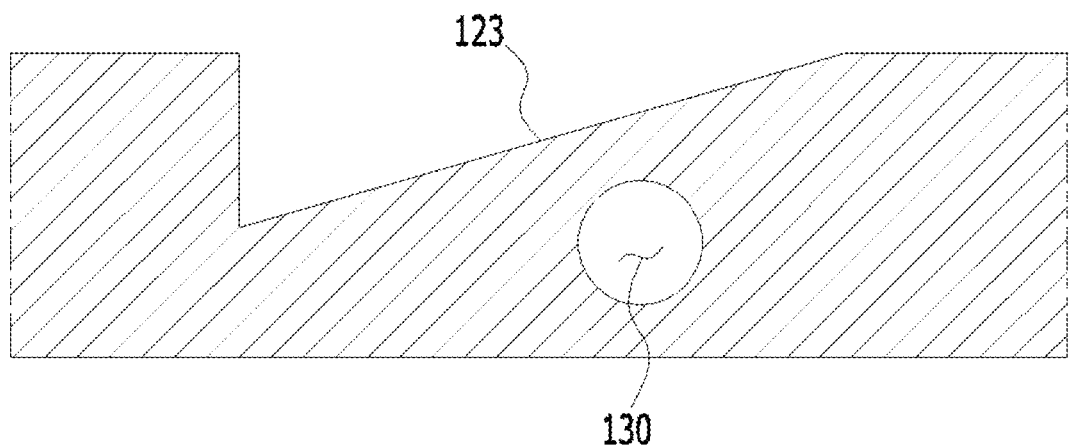
FIG. 6 is a sectional view taken along line A-A' of FIG. 5.

FIG. 5 is a plan view showing a reinforcing disk of a compressor according to a further embodiment of the present disclosure; and FIG. 6 is a sectional view taken along line A-A' of FIG. 5.

Referring to the drawings, the swelling part 122 of the reinforcing disk 120 according to the embodiment may be provided with an inclined surface 123 inclined at a predetermined angle.

Here, as shown in FIG. 5, it is preferred that the inclined surface 123 may be provided at a location facing a rotation direction of the reinforcing disk 120 to reduce a circumferential velocity component of the compressed air flowing toward the rotation shaft 101.

Accordingly, the compressor 100 according to the embodiment configured as described above is capable of leading to smooth flow of the compressed air flowing toward the rotation shaft, and as a result, it is possible to significantly improve cooling effect on the main disks and the rotation shaft.

Another Embodiment of Reinforcing Disk 120

Figure 7:
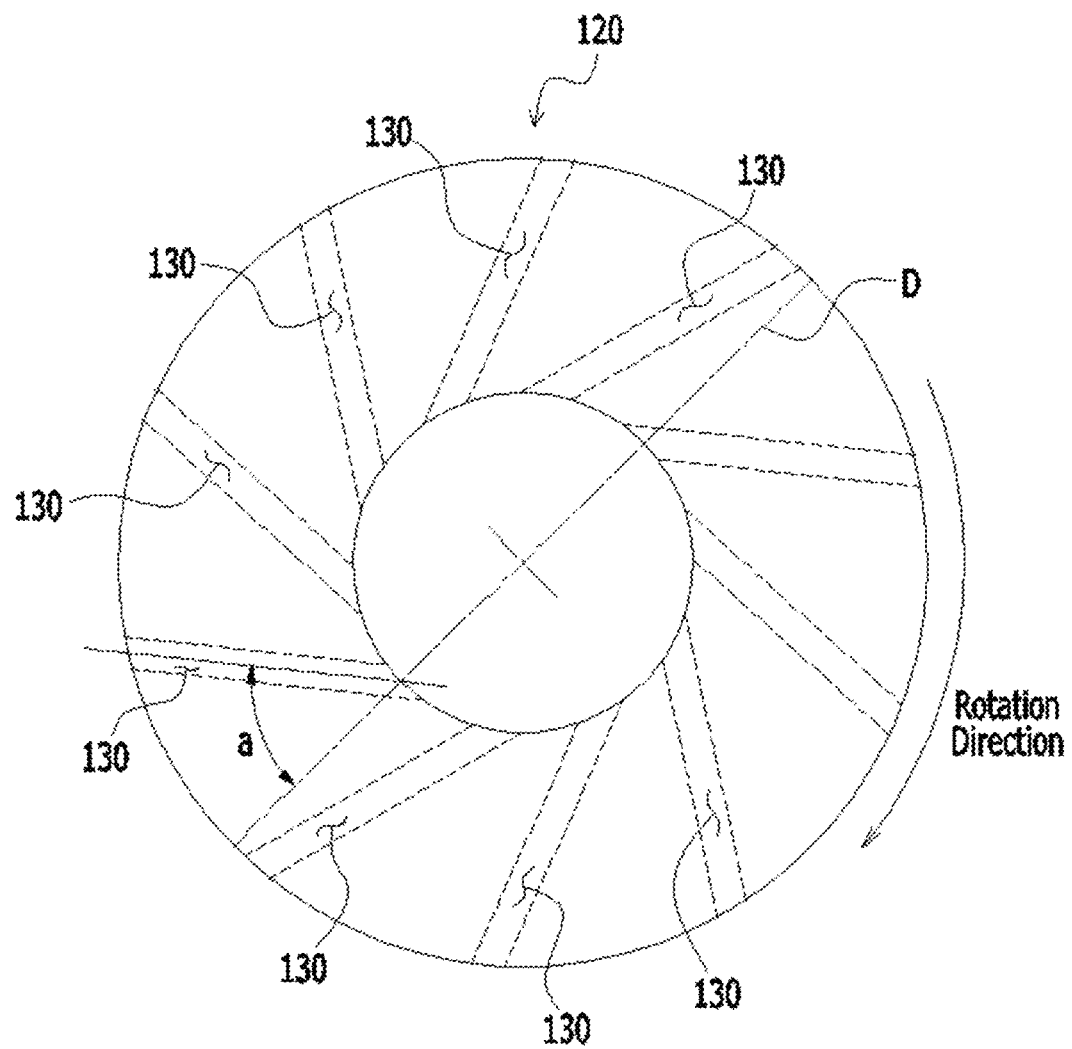
FIG. 7 is a plan view showing the reinforcing disk of the compressor according to an embodiment of the present disclosure.

FIG. 7 is a plan view showing the reinforcing disk of the compressor according to an embodiment of the present disclosure.

Referring to FIG. 7, it is preferred that the passage 130 provided in the reinforcing disk 120 according to the embodiment be inclined in a direction opposite to a rotation direction of the reinforcing disk 120.

To be more specific, an inclination angle a of the passage 130 is not particularly limited as long as the inclination angle allows the compressed air to flow toward the rotation shaft 101 by the rotation of the reinforcing disk 120, and preferably, the inclination angle of the passage ranges from 30 degrees to 60 degrees based on an imaginary diameter (D) passing through the rotation shaft of the reinforcing disk. More preferably, the inclination angle ranges from 40 degrees to 50 degrees.

Accordingly, the compressor 100 according to the embodiment configured as described above is capable of leading to smooth flow of the compressed air flowing toward the rotation shaft, and as a result, it is possible to significantly improve cooling effect on the main disks and the rotation shaft.

Further Embodiment of Reinforcing Disk 120

Figure 8:
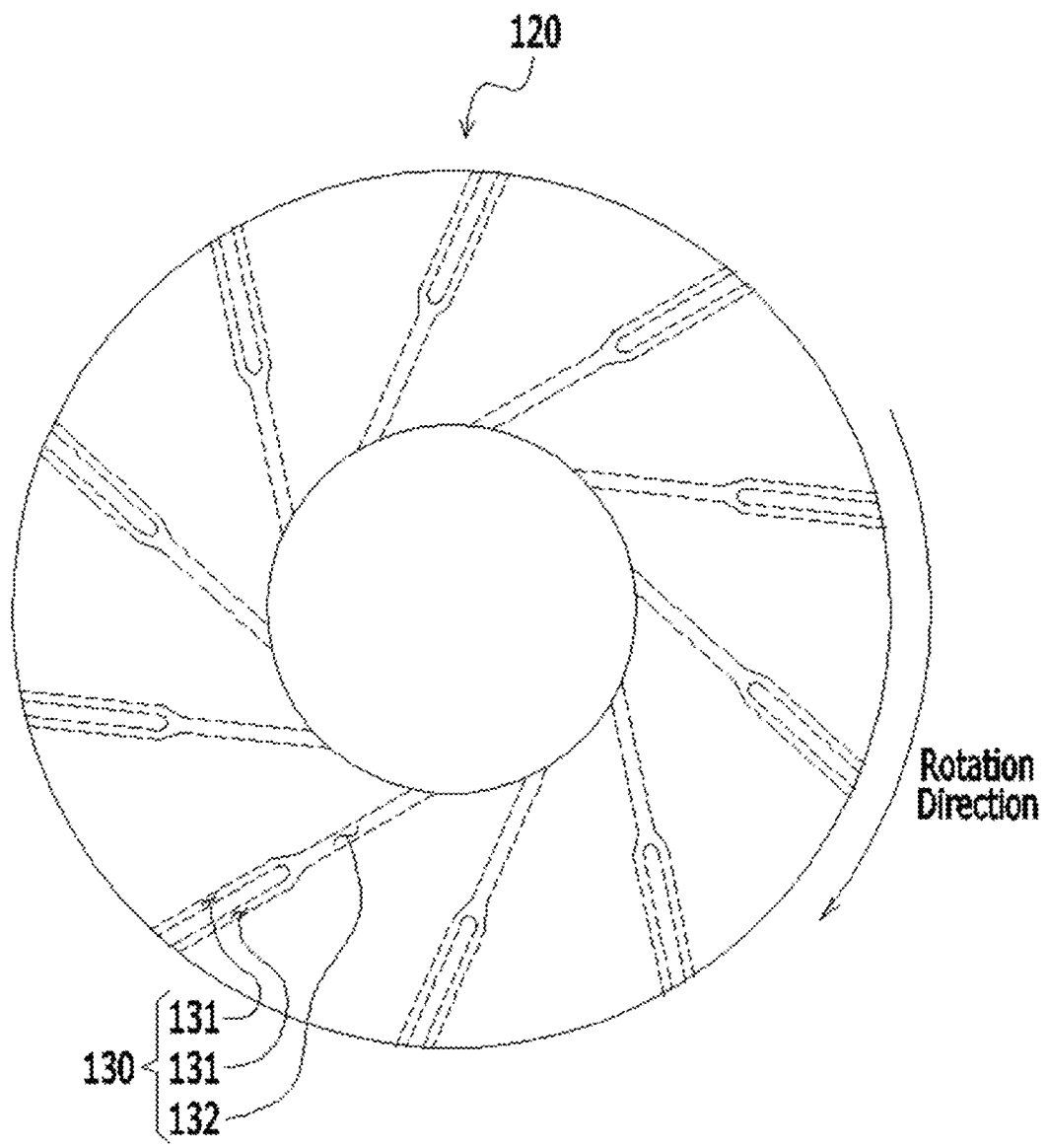
FIG. 8 is a plan view showing the reinforcing disk of the compressor according to another embodiment of the present disclosure.
Figure 9:
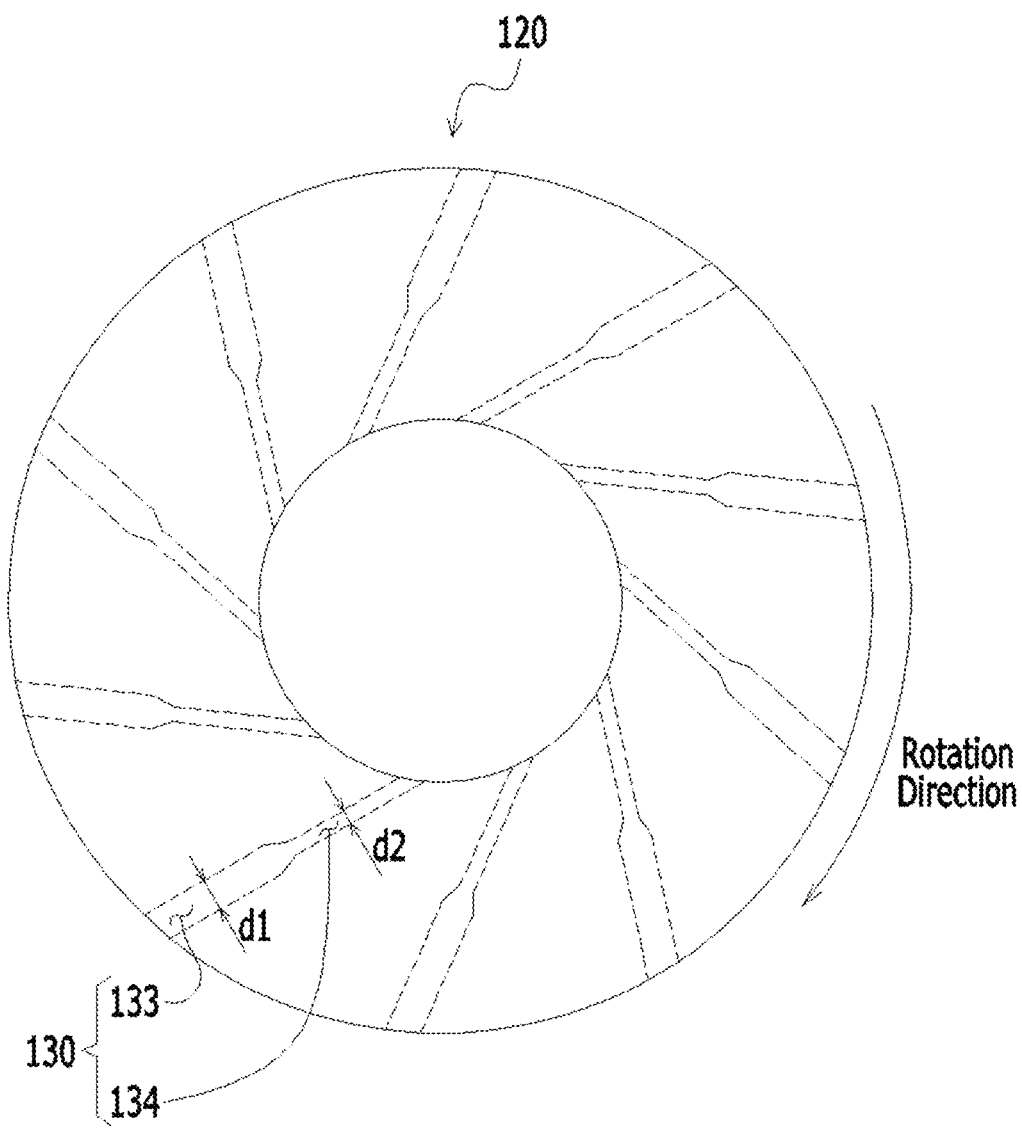
FIG. 9 is a plan view showing the reinforcing disk of the compressor according to a further embodiment of the present disclosure.

FIGS. 8 and 9 are plan views showing reinforcing disks of a compressor according to further embodiments of the present disclosure.

Firstly, referring to FIG. 8, the reinforcing disk 120 according to the embodiment may include inflow passages 131 and a discharge passage 132 having predetermined structures.

To be more specific, at least two inflow passages 131 may be provided in the reinforcing disk 120 in a direction from the outer circumferential surface thereof toward the rotation shaft 101, and may be spaced apart from each other at a predetermined interval.

Further, the discharge passage 132 may be provided in the reinforcing disk 120 to communicate with the inflow passages 131 and with an end of the reinforcing disk 120, so as to allow the compressed air flowing from the inflow passages 131 to flow toward the rotation shaft 101.

Next, referring to FIG. 9, the reinforcing disk 120 according to the embodiment may include an inflow passage 133 and a discharge passage 134 having predetermined structures.

To be more specific, the inflow passage 133 may be provided in the reinforcing disk 120 in a direction from the outer circumferential surface thereof toward the rotation shaft 101, and may have an inner diameter d1 of a predetermined size.

Further, the discharge passage 134 may be provided in the reinforcing disk 120 to communicate with the inflow passage 133 and with an end of the reinforcing disk 120 so as to allow the compressed air flowing from the inflow passage 133 to flow toward the rotation shaft 101, and may have an inner diameter d2 smaller than the inner diameter d1 of the inflow passage 133.

The sizes of inner diameters of the inflow passages 133 and the discharge passage 134 may be changed according to the designer's intention.

Accordingly, the compressor 100 according to the embodiment configured as described above is capable of leading to smooth flow of the compressed air flowing toward the rotation shaft, and as a result, it is possible to significantly improve cooling effect on the main disks and the rotation shaft.

Still Another Embodiment of Reinforcing Disk 120

Figure 10:
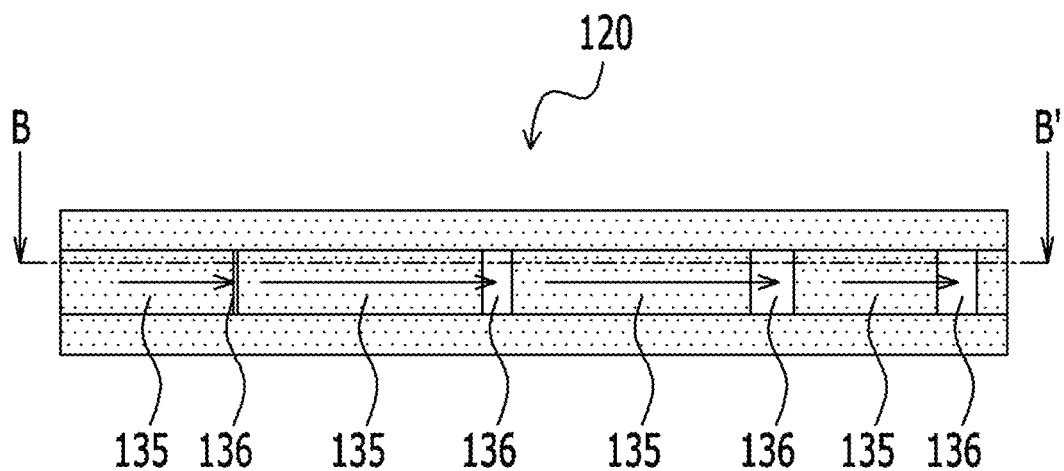
FIG. 10 is a front view showing a reinforcing disk of a compressor according to still another embodiment of the present disclosure.
Figure 11:
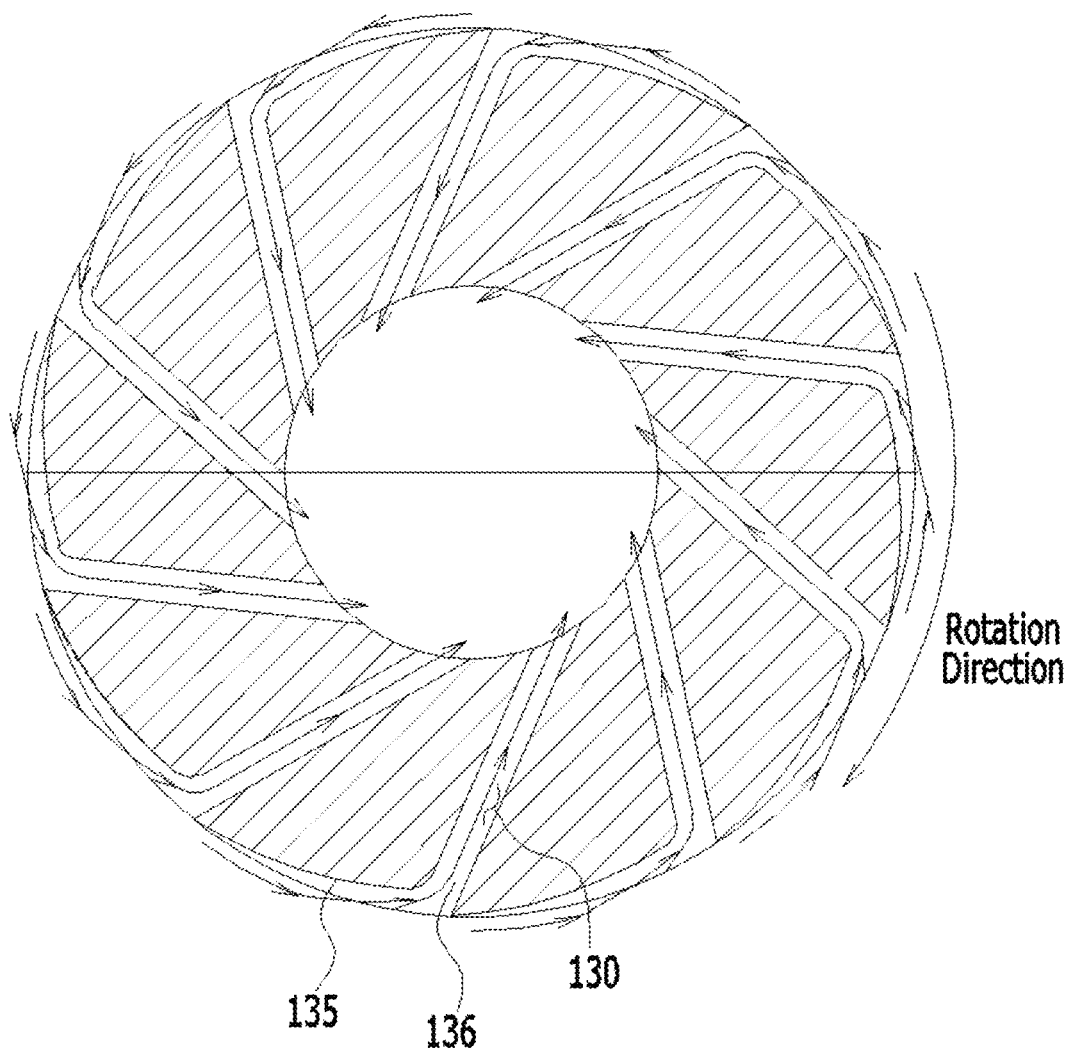
FIG. 11 is a sectional view taken along line B-B' of FIG. 10.

FIG. 10 is a front view showing a reinforcing disk of a compressor according to still another embodiment of the present disclosure; and FIG. 11 is a sectional view taken along line B-B' of FIG. 10.

Referring to the drawings, a plurality of passages 130 may be provided in the reinforcing disk 120 according to the embodiment, which are inclined in a direction facing a rotation direction of the reinforcing disk 120.

Here, it is preferred that the passages 130 be arranged to be spaced apart from each other at predetermined angles and predetermined intervals.

Further, as shown in FIGS. 10 and 11, the outer circumferential surface of the reinforcing disk 120 is provided with an inclined surface 135 inclined toward an inlet 136 of the passage 130 to easily induce inflow of the compressed air.

Accordingly, the compressor 100 according to the embodiment configured as described above is capable of leading to smooth flow of the compressed air flowing toward the rotation shaft, and as a result, it is possible to significantly improve cooling effect on the main disks and the rotation shaft.

The present disclosure further provides a gas turbine having the above described compressor 100 according to the present disclosure.

Accordingly, according to the gas turbine of the present disclosure, since it is provided with the compressor 100 having a predetermined structure, it is possible to provide a gas turbine that is structurally reinforced and is capable of significantly improving cooling effect on the main disks and the rotation shaft, and improving internal extraction pressure drop reduction performance of a vortex reducer.

While the present disclosure has been described in conjunction with exemplary embodiments thereof, it is to be understood that the present description is not limited to those exemplary embodiments. On the contrary, the present disclosure is intended to cover not only the exemplary embodiments, but also various alternatives, modifications, equivalents and other embodiments that may be included within the spirit and scope of the appended claims.

In other words, the present disclosure is not limited to the exemplary embodiments nor to the above description, and those skilled in the art will appreciate that various modifications, additions and substitutions are possible, without departing from the scope and spirit of the disclosure.

What is claimed is:

1. A compressor for a gas turbine, comprising:
a rotation shaft;
a first main disk that is coupled to an outer circumferential surface of the rotation shaft and includes a first circumferential side surface facing in a first circumferential direction of the rotation shaft; and
a second main disk coupled to the outer circumferential surface of the rotation shaft, the second main disk including a second circumferential side surface facing in a second circumferential direction of the rotation shaft opposite to the first circumferential direction;
a reinforcing disk disposed between the first and second main disks, the reinforcing disk having a first radial end disposed toward the rotation shaft and a second radial end facing in a direction opposite to the first radial end and including:
a swelling part forming the first radial end and having axial sides that are separated from either of the first and second main disks;
a mount portion forming the second radial end and including a first mount part coupled to the first circumferential side surface and a second mount part coupled to the second circumferential side surface; and
a passage that is formed between the first and second mount parts and extends through a circumferential center of the reinforcing disk in a radial direction of the rotation shaft to communicate with each of the first and second radial ends of the reinforcing disk,
wherein the first and second main disks are spaced apart from each other such that a space is defined between the first and second circumferential side surfaces, the space configured to pass compressed air from the compressor to the rotation shaft, the space including:
an outer plenum formed on a radially outer side of the mount portion to communicate with the passage, and
an inner plenum formed on a radially inner side of the mount portion to communicate with the rotation shaft along the axial sides of the swelling part,
wherein the swelling part has a shape corresponding to one radial end of the inner plenum, and
wherein the passage is configured to pass a portion of the compressed air from the outer plenum to the rotation shaft.

2. The compressor of claim 1, wherein each of the main disks includes:
a support forming an outer periphery of a corresponding main disk of the main disks; and
a side support integrally formed with the support and laterally extending towards a neighboring main disk.

3. The compressor of claim 2, wherein the support includes an outer end having curved surfaces and an inner end having a polygonal cross section that increases in width toward the outer periphery of the corresponding main disk of the main disks.

4. The compressor of claim 2, wherein the reinforcing disk is disposed between the side support and a neighboring side support.

5. The compressor of claim 2,
wherein the reinforcing disk is operable to rotate about the rotation shaft;
wherein the mount portion has a shape corresponding to a first end of the side support; and
wherein the swelling part is integrally formed with and extending from the mount portion.

6. The compressor of claim 5, wherein the swelling part has a cross section with an increasing width.

7. The compressor of claim 5, wherein
the swelling part includes an inclined surface at a first side, and
the inclined surface is disposed at a location facing a rotation direction of the reinforcing disk to reduce a circumferential velocity component of the compressed air flowing toward the rotation shaft.

8. The compressor of claim 1, wherein the mount portion is configured to couple the first main disk and the second main disk to each other.

9. The compressor of claim 1, wherein the passage of the reinforcing disk is inclined in a direction opposite to a rotation direction of the reinforcing disk.

10. The compressor of claim 9, wherein an inclination angle of the passage is in the range of 30 degrees to 60 degrees with respect to an imaginary diameter passing through the rotation shaft at the reinforcing disk.

11. A gas turbine, comprising:
a compressor generating high temperature and high pressure compressed air and supplying the compressed air to a combustor, the compressor including:
a rotation shaft;
a first main disk that is coupled to an outer circumferential surface of the rotation shaft and includes a first circumferential side surface facing in a first circumferential direction of the rotation shaft; and
a second main disk coupled to the outer circumferential surface of the rotation shaft, the second main disk including a second circumferential side surface facing in a second circumferential direction of the rotation shaft opposite to the first circumferential direction;
a reinforcing disk disposed between the first and second main disks, the reinforcing disk having a first radial end disposed toward the rotation shaft and a second radial end facing in a direction opposite to the first radial end and including:
a swelling part forming the first radial end and having axial sides that are separated from either of the first and second main disks;
a mount portion forming the second end and including a first mount part coupled to the first circumferential side surface and a second mount part coupled to the second circumferential side surface; and
a passage that is formed between the first and second mount parts and extends through a circumferential center of the reinforcing disk in a radial direction of the rotation shaft to communicate with each of the first and second radial ends of the reinforcing disk,
wherein the first and second main disks are spaced apart from each other such that a space is defined between the first and second circumferential side surfaces, the space configured to pass compressed air from the compressor to the rotation shaft, the space including:
an outer plenum formed on a radially outer side of the mount portion to communicate with the passage, and
an inner plenum formed on a radially inner side of the mount portion to communicate with the rotation shaft along the axial sides of the swelling part,
wherein the swelling part has a shape corresponding to one radial end of the inner plenum, and
wherein the passage is configured to pass a portion of the compressed air from the outer plenum to the rotation shaft.

12. The gas turbine of claim 11,
wherein the reinforcing disk is operable to rotate about the rotation shaft;
wherein the mount portion is configured to couple the first main disk and the second main disk to each other; and
wherein the swelling part is integrally formed with and extending from the mount portion.

13. The gas turbine of claim 11, wherein the passage of the reinforcing disk is inclined in a direction opposite to a rotation direction of the reinforcing disk.

14. A compressor for a gas turbine, comprising:
a rotation shaft;
first and second main disks coupled to an outer circumferential surface of the rotation shaft and spaced apart from each other such that a portion of compressed air flows toward the rotation shaft; and
a reinforcing disk disposed in a space defined between the first and second main disks, the reinforcing disk being operable to rotate about the rotation shaft and including a passage that is radially formed through a circumferential center of the reinforcing disk in a direction from an outer circumferential surface of the reinforcing disk toward the rotation shaft, the reinforcing disk further including:
a first radial end disposed toward the rotation shaft,
a second radial end facing in a direction opposite to the first radial end,
a swelling part formed between the first and second radial ends, the swelling part having axial sides that are separated from either of the first and second main disks,
wherein the space communicates with the rotation shaft along the axial sides of the swelling part.

* * * * *